United States Patent
Polley et al.

(10) Patent No.: US 8,369,190 B2
(45) Date of Patent: Feb. 5, 2013

(54) PROXIMITY SENSING SYSTEM

(75) Inventors: Arup Polley, Richardson, TX (US);
Rajarshi Mukhopadhyay, Allen, TX (US); Reza Sharifi, Cupertino, TX (US); Mark A. Wolfe, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/079,544

(22) Filed: Apr. 4, 2011

(65) Prior Publication Data

US 2012/0250484 A1 Oct. 4, 2012

Related U.S. Application Data

(60) Provisional application No. 61/355,042, filed on Jun. 15, 2010.

(51) Int. Cl.
*G11B 11/00* (2006.01)
*G11B 21/02* (2006.01)

(52) U.S. Cl. ........ 369/13.11; 360/75; 360/69; 369/13.2; 369/44.35; 369/53.39

(58) Field of Classification Search ............... 369/44.11, 369/44.19, 44.29, 44.35, 53.29, 53.39, 13.11, 369/13.12, 13.2; 360/69, 75, 77.05, 77.07, 360/59

See application file for complete search history.

(56) References Cited

U.S. PATENT DOCUMENTS

| | | | | |
|---|---|---|---|---|
| 4,286,296 A * | 8/1981 | Cunningham | ............. | 360/77.07 |
| 5,903,857 A * | 5/1999 | Behrens et al. | ................. | 360/65 |
| 6,032,284 A * | 2/2000 | Bliss | ............................... | 360/40 |
| 6,094,316 A * | 7/2000 | Pham et al. | ..................... | 360/65 |
| 6,181,497 B1 * | 1/2001 | Malone, Sr. | .................... | 360/48 |
| 6,445,520 B1 * | 9/2002 | Yang et al. | ...................... | 360/53 |

* cited by examiner

*Primary Examiner* — Thang Tran
(74) *Attorney, Agent, or Firm* — Lawrence J. Bassuk; W. James Brady; Frederick J. Telecky, Jr.

(57) ABSTRACT

A data storage system for detecting a location of a head relative to a magnetic media is described. This system comprises arms, a preamplifier circuit coupled to the arms for controlling the arms, a proximity sensing system positioned within the preamplifier circuit, the proximity sensing system comprising: an input stage for transmitting an input sense signal; a programmable gain stage coupled to receive the input sense signal and operative for transmitting a gain signal in response to receiving the input sense signal; a multiplexer coupled to receive the gain signal and at least one control signal, the multiplexer operative for transmitting a multiplexed signal; a detector coupled to receive the multiplexed signal and a second control signal, the detector operative for transmitting an output signal; wherein an amplitude associated with the output signal enables detecting the location of the head.

10 Claims, 16 Drawing Sheets

PROXIMITY SENSING SYSTEM

This application claims priority under 35 USC §119(e)(1) of provisional application No. 61/355,042, filed Jun. 15, 2010.

DESCRIPTION OF RELATED ART

With the evolution of electronic devices, there is a continual demand for enhanced speed, capacity and efficiency in various areas including electronic data storage. Motivators for this evolution may be the increasing interest in video (e.g., movies, family videos), audio (e.g., songs, books), and images (e.g., pictures). Hard disk drives have emerged as one viable solution for supplying high capacity storage by effectively reading and writing data from an associated magnetic media using a head. As the densities of magnetic media increase, monitoring this head while positioning it closely to the magnetic media without contacting it become quite important. Consequently, there remain unmet needs relating to data storage devices.

BRIEF DESCRIPTION OF THE DRAWINGS

The proximity sensing system may be better understood with reference to the following figures. The components within the figures are not necessarily to scale, emphasis instead being placed upon clearly illustrating the principles of the invention. Moreover, in the figures, like reference numerals designate corresponding parts or blocks throughout the different views.

Figure 1:
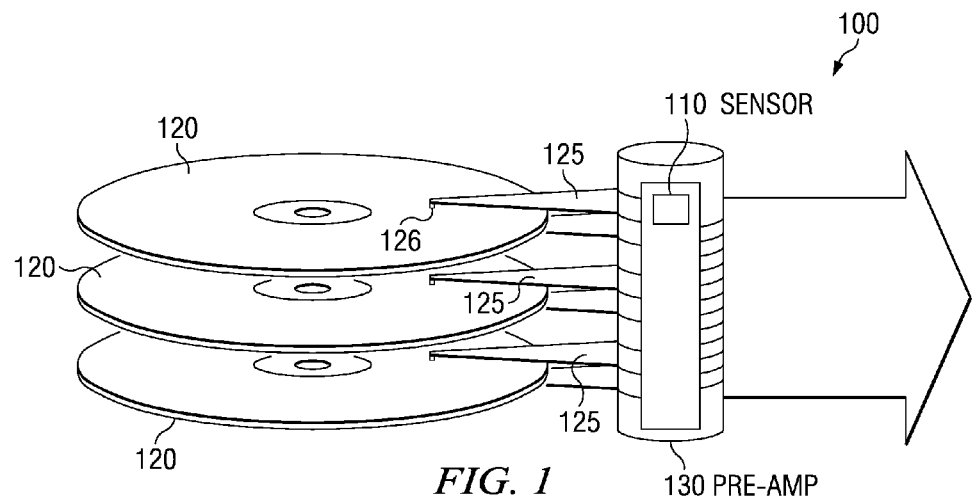
FIG. 1 is an illustrative environmental drawing of a data storage system that includes a proximity sensing system.

While the proximity sensing system is susceptible to various modifications and alternative forms, specific embodiments have been shown by way of example in the drawings and subsequently are described in detail. It should be understood, however, that the description herein of specific embodiments is not intended to limit the proximity sensing system to the particular forms disclosed. In contrast, the intention is to cover all modifications, equivalents, and alternatives falling within the spirit and scope of the proximity sensing system as defined by this document.

DETAILED DESCRIPTION OF EMBODIMENTS

As used in the specification and the appended claim(s), the singular forms "a," "an" and "the" include plural referents unless the context clearly dictates otherwise. Similarly, "optional" or "optionally" means that the subsequently described event or circumstance may or may not occur, and that the description includes instances where the event or circumstance occurs and instances where it does not.

FIG. 1 is an illustrative environmental drawing of a data storage system 100 that includes a proximity sensing system 110. This data storage system may include media 120 (e.g., a magnetic disk) that stores data, which can be accessed either during a read or write operation. Arms 125 can extend across the media 120, for example, during a write operation or a read operation. More specifically, heads 126 extend from the arms 125 and actually write or read data from the media 120. The performance and reliability of the data storage system 100 depends in large part on the proximity of these heads 126 to the media 120, which is controlled by signals sent from a preamplifier circuit 130. This preamplifier circuit includes the proximity sensing system 110, which can determine a position of the head 126 relative to the associated media 120. In addition, this proximity sensing system can also determine when the head 126 actually contacts the media 120.

More specifically, the proximity sensing system 110 enables the head 126 to be in very close proximity to the media 120, or have a low fly height. By facilitating a low fly height, the proximity sensing system 110 reduces a minimum bit cell size and enables more data stored within the same area. A low fly height during reading data also results in higher magnetic flux picked up by the head, which results an increased signal-to-noise ratio (SNR) of the signal read by the preamplifier, which in turn results in a lower bit error rate (BER). Similarly, a low fly height results in higher concentration of magnetic fields while writing data, which means that the preamplifier 130 consumes less power. While the proximity sensing system 110 does facilitate a low fly height, this system also detects when the head 126 contacts the media 120. If this head hits bumps, or scratches this media's surface, the head's reliability may be reduced or the head may be permanently damaged. When the head 126 touches the media 120, a mechanical impulse and friction heats this media and head, which is known as a "Thermal Asperity" (TA) event.

The proximity sensing system 110 detects proximity of the head 126 to the media 120 and consequently increases the reliability and the performance of the head 126. In fact this head may include thermal sensors, such as resistors, with a temperature coefficient such that the effective resistance of the sensor changes with changes in sensor temperature, which produces a sensed signal with a change of temperature. The preamplifier 130 may amplify the sensed signal through a low noise path with signal processing and detect the amplified signal using a detection circuit that finally declares a fault signal or an analog fly height sensing signal. When these signals are known, the proximity sensing system 110 can determine an optimum fly height and transmit an optimization signal used in adjusting the fly height to the optimum height. The preamplifier circuit 130 can relay a modified optimization signal to a fly height adjustment device, such as a heater. This device can then physically adjust the height of the appropriate head 126.

Figure 2:
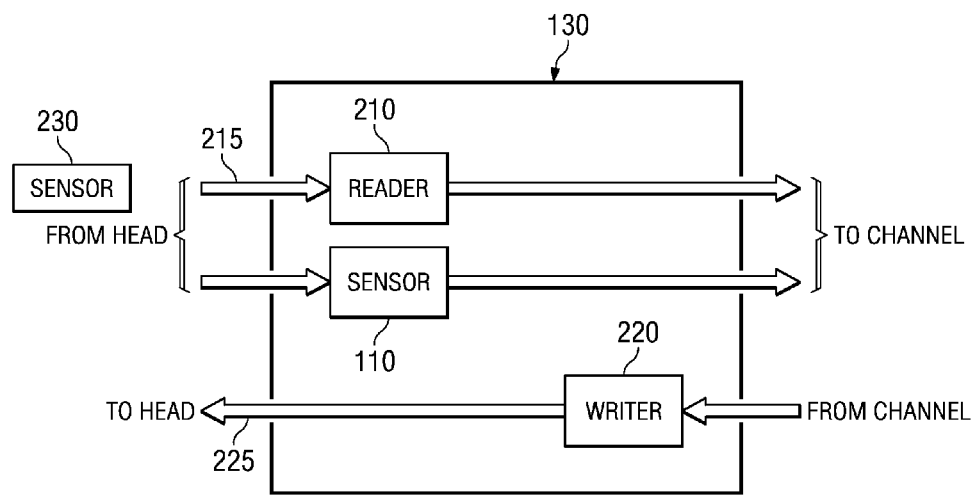
FIG. 2 is a block diagram of a preamplifier with the proximity sensing system of FIG. 1.

FIG. 2 is a block diagram of a preamplifier 130 with the proximity sensing system 110. This preamplifier includes a reader 210 that may receive a read signal 215 from the head 126. The preamplifier 130 also includes a writer 220 that may transmit a write signal 225 to the head 126. A sensor 230 external to the preamplifier 130 may transmit a sensed signal associated with one head. The proximity sensing system 110 may receive this signal and determine the proximity of this head to the media 120. In one example, the proximity of the head 126 may be zero, such that this head is contacting the media 120. In another example, the proximity of the head to the media may be relatively small, such that the head is fairly close to the media 120, but has not contacted it. Another implementation may exist where the proximity of head 126 to the media is large, such that this head is fairly far away from the media 120. The proximity sensing system 110 detects proximity of the head 126 to the media 126 in all of the above situations, as well as for every distance between the ones mentioned above.

Figure 3A:
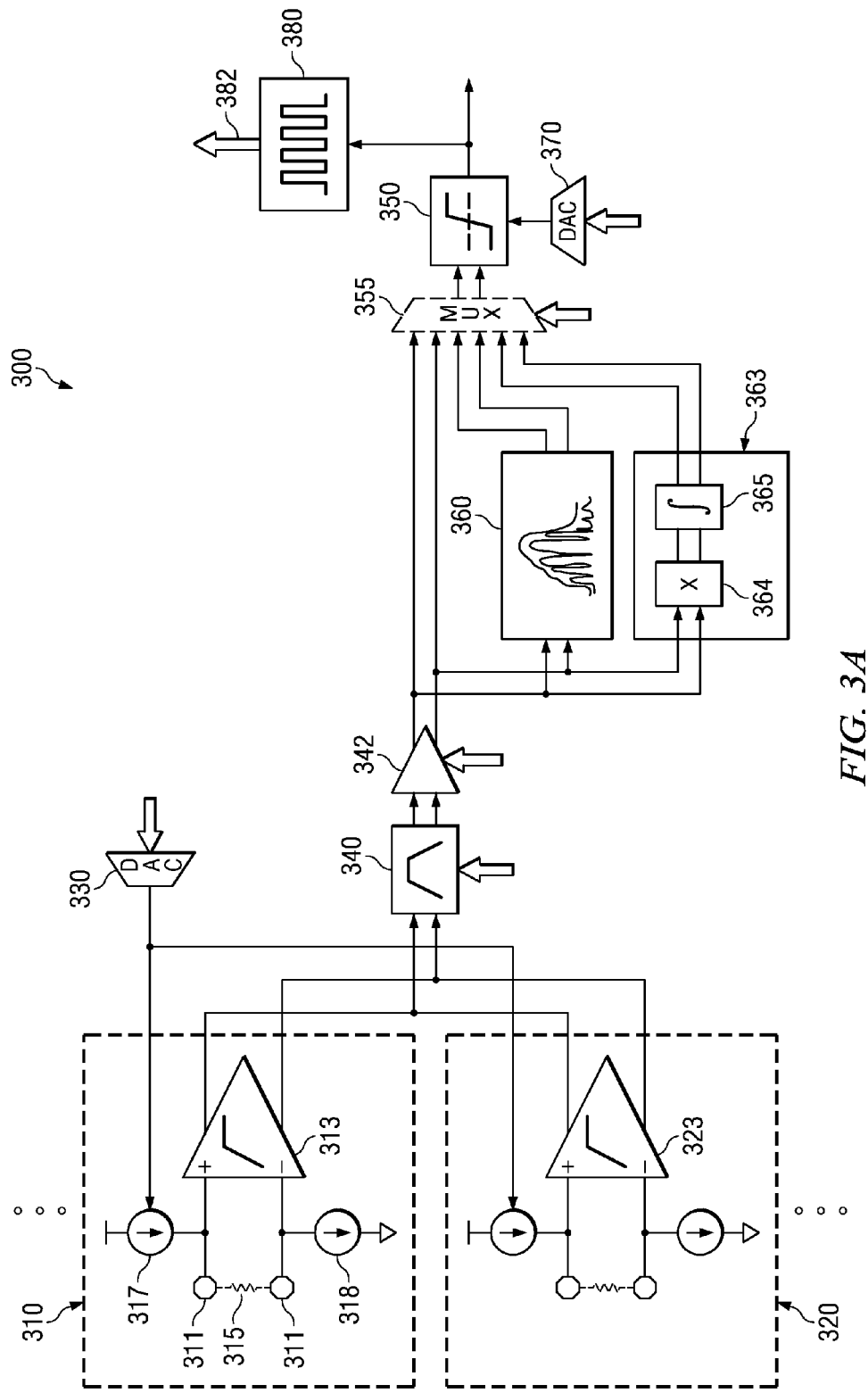
FIG. 3A is a block diagram of a first implementation of the proximity sensing system.

FIG. 3A is a block diagram 300 of a first implementation of the proximity sensing system 110. In this diagram, block 310 includes electronic components that may be associated with one head 126, while the block 320 may include electronic components associated with a different head 126. Though only two blocks are shown, there may be two blocks, three blocks or some other suitable number of blocks. In one implementation, there may be one block associated with each head monitored by the proximity sensing system 110. In addition, one implementation may include substantially similar components as shown in FIG. 3A, while another implementation may include slightly different components in each block. Block 310 includes input pads 311 for receiving the sensed signal from the head 126. An input stage, such as amplifier 313, amplifies the sensed signal received on the input pads. A digital to analog converter 330 may connect to each block, such as block 310, and bias resistor 315. A sense resistor 315 may be biased in either a constant voltage-mode or constant current-mode. Biasing this resistor in a constant current-mode varies the voltage across the resistor 315 that is amplified as the detection signal. Biasing this resistor in a constant voltage-mode varies the current through the resistor 315, which is amplified as the detection signal. The block 310 also includes current sources 317, 318 that can either source or sink current that enables generation of a desired bias voltage/current on the sensor element. The sensor bias increases the sensitivity of the sensor, i.e., larger the sensor bias, larger the detected sensor signal amplitude. Design of the converter plays a significant role in the noise performance of the sensor amplifier at low frequencies (due to flicker noise). In addition, this converter can bias the input stages associated with each of the channels, such as the channels associated with blocks 310, 320.

Figure 3B:
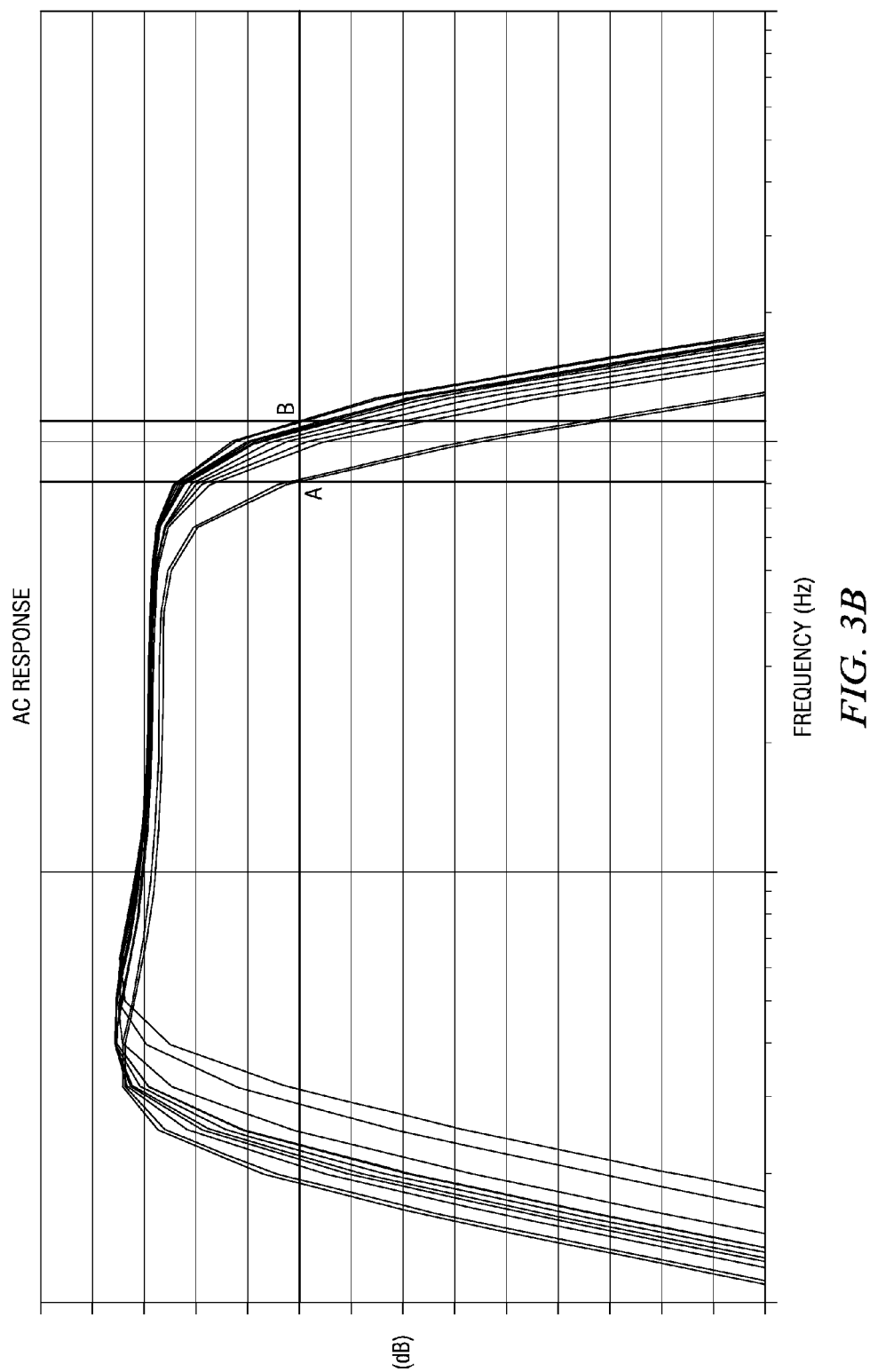
FIG. 3B is a plot illustrating the effectiveness of the band pass filter of FIG. 3A.

Each of the input stages, such as input stage 313 and input stage 323, may transmit an input sense signals. A filter 340 transmits a filtered signal after receiving the input sense signals, which means that the filter is a common stage that multiplexes the input sense signals and reduces circuit components. The filter 340 may be a band pass filter with programmable high-pass & low-pass corner frequencies. Typical high-pass corner frequencies vary from 120 kHz to 1 MHz, and low-pass corner frequencies vary from 500 kHz to 10 MHz. The filter high-pass & low-pass corner frequencies can be programmed by the hard disk controller through the serial port in order to optimize the SNR of the sensed signal such that only meaningful sensor frequencies are allowed to pass through. The sensor frequencies may vary across sensor manufacturing process corners, ambient conditions in the drive, and over time. Also, the sensor might not have a single tone frequency and the power spectrum might be distributed in a band of frequencies, which enables use of a band-pass filter instead of a resonant system. The order of the low-pass & high-pass filters can vary depending on the sensor signal power spectrum. In one application, one can use a $2^{nd}$ order high-pass filter and a $3^{rd}$ order low-pass filter. Noise at high frequencies can be a concern and can result in false detection. Hence, the higher the order of the low-pass filter, the better the chances of real detection. The filters can be implemented either as RC-filters or gm-C filters depending on their placement in the sensor architecture, since gm-C filters might have low input dynamic range and hence, need to be placed before the gain stage. FIG. 3B is a plot illustrating the effectiveness of the band pass filter 340.

A gain device 342 transmits a gain signal after receiving the filtered signal. The sensor signal amplitude varies with time, manufacturing variations of the sensor, and other ambient conditions in the drive. Hence, the gain device may be a programmable gain device or the like. Typical system gain used for the entire sensor path is approximately 20V/V to approximately 600V/V. In addition, this gain device may also be a low noise gain stage. This may be beneficial to further reduce the impact of noise on the sensor signal. A detector 350 may directly receive the gain signal from the gain device 342. In an alternative implementation, a multiplexer 355 may receive the gain signal and then transmit a multiplexed signal to the detector. At approximately the same time, an envelope detector 360 and a integrated energy detector may also receive the gain signal. The multiplexer 355 may also receive a control signal 356 from the serial port controlled by channel that selects, which of the inputs to the multiplexer gets transmitted as the multiplexed signal.

The envelope detector 360 receives the gain signal and creates a rectified gain signal, or collection of signals whose combined duration and intensity is approximately equal to the duration and intensity of the gain signal. In other words, this envelope detector rectifies the gain signal by creating an instantaneous energy component that allows enhancement of the signal only apart from the noise, which increases the signal to noise ratio of the gain signal. The multiplexer 355 receives this rectified gain signal on one of its inputs. In one implementation, the multiplexer 355 may transmit the rectified gain signal from the envelope detector 360 to the detector 350. This may occur when the envelope detector mode is enabled through the serial port. The instantaneous energy detection performed by the envelope detector proves to be more useful than the normal detection technique when the SNR of the sensor input signal is very low.

The integrated energy detector (IED) 363 may further improve the reliability in detection of a temporally spread signal by enhancing the signal to noise ratio. To accomplish this, the IED 363 may include one or more devices such as a multiplier 364 and an integrator 365. This IED then transmits a reliability enhanced signal to the multiplexer 355. The multiplexer 355 receives this rectified gain signal on one of its inputs. In one implementation, the multiplexer 355 may transmit the reliability enhanced signal from the IED 363 to the detector 350. This may occur when the IED mode is enabled through the serial port.

As the detector 350 receives the multiplexed signal, this detector also receives a threshold control signal from a threshold control device 370. This device may set the threshold control signal by using any number of variables including a digital signal bus that controls a current/voltage DAC that sets a threshold voltage/current in a comparator, or the like. As the detector 350 receives the multiplexed signal, it can transmit a fault signal when the multiplexed signal exceeds the threshold control signal. In other words, the proximity sensing system 110 can generate a fault signal when it detects the proximity to the head 126 to the media 125, such as in the circumstances described above. The detector 350 may include two comparators, for example, that analyze a positive and negative voltage with respect to the bias voltage. In addition, the block diagram includes a counter 380 that can monitor the number of fault events that occurs. This counter may be any one of several types of counters such as an 8-bit counter, 4-bit counter or the like. When the number of faults exceeds a count threshold, the counter can transmit a second fault signal 382.

Figure 4A:
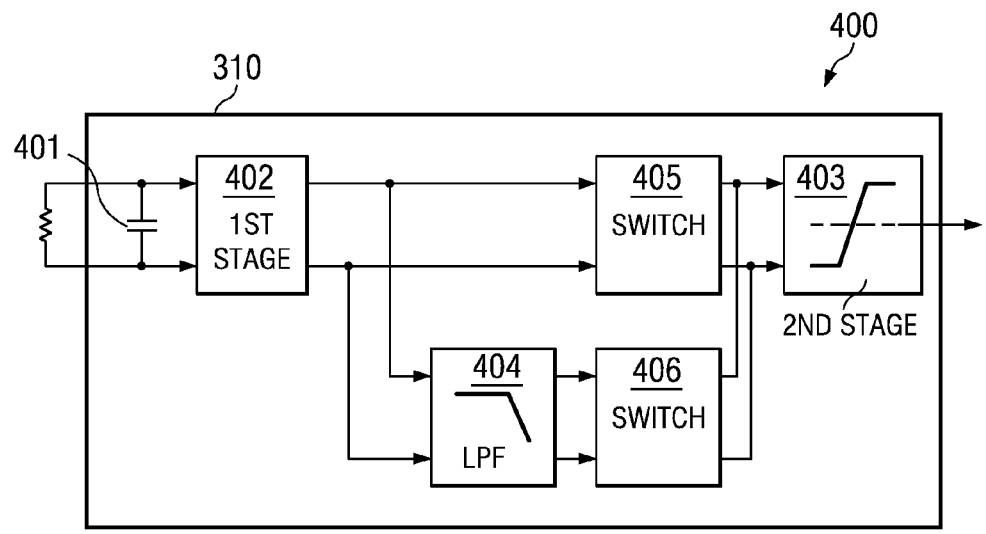
FIG. 4A is a block diagram of an implementation of the input stage of FIG. 3A.

FIG. 4A is a block diagram 400 of an implementation of the input stage 310, which may be a single reader input stage. This diagram includes an input capacitor 401, a first stage 402, second stage 403, a low pass filter 404, switch 405, and a switch 406 along a bypass path 407. Placing the input capacitor 401 at the sensor input creates a low-pass filter at the sensor. This low-pass filter filters out higher frequency signals that may be large in amplitude. In a hard-disk drive, a major concern is the operation of the sensor in WRITE mode when the writer is enabled. The writer generates large signal voltages that can get coupled into the sensor and disable the desired operation of the filter altogether. There might also be other sources of large noise signals in the hard-disk drive system. A large sensor signal amplitude could also potentially saturate the consequent filter 340 (see FIG. 3A) depending on the input dynamic range of the filter. The low-pass filter at the sensor reduces all the high-frequency noise signals, which helps in reducing the overall sensor signal amplitude. The stage 402 amplifies the filtered input signal that it receives and transmits an amplified input signal. The bypass path 407 and the filter 404 receive the amplified input signal. The switches 405, 406 may be alternatively closed. For example, the switch 406 in the bypass path may close and transfer the amplified signal to the stage 403 when the height sensing system 110 needs to detect high sensor frequencies by bypassing the low-pass filter 404. This mode is used typically for thermal asperity event detection, i.e., when the head strikes an unwanted particle on the media which is relatively large in size as compared to the magnetic head; during this mode, switch 405 is opened. In contrast, the switch 405 may be closed when the sensor needs to detects that the head is in close proximity to the media, such as when the head is at relatively lower sensor frequencies. In addition, the filter 404 may be a low-pass filter with a fairly high input dynamic range to accommodate large signal noise amplitudes. The low-pass filter 404 plays the most significant role in write mode, where large writer signals get coupled into the sensor and can cause false detection. To increase the SNR of the sensor signal, the filter 404 needs to have a large order, typically fourth order to provide a sharp roll-off for frequencies higher than the corner frequency. The order of the filter is determined by the required attenuation of the writer/noise signal at their respective frequencies such that the writer/noise signal amplitude after significant attenuation of the sensor signal amplitude. This would ensure good SNR for reliable proximity detection. In addition, the filter 404 needs to have a large input dynamic range in order to accommodate large write/noise signals without getting saturated. Typical implementations of 404 are RC-type, Sallen-Key-type, gm-C type with high input dynamic range, etc. Another implementation of this reader input stage may not include the switches 405-406 and the filter 404. Another alternative implementation may include low pass filters in all subsequent stages. For example, the block 313 (see FIG. 3A) may include the implementation described in diagram 400 within the input stage 313, while block 323 and all subsequent blocks may include low pass filters within the input stage 323. The design of the filter 404 needs to be done carefully (choosing the corner frequency around 10 times the desired system low-pass corner frequency) so as to not affect the overall low-pass filter characteristics.

Figure 4C:
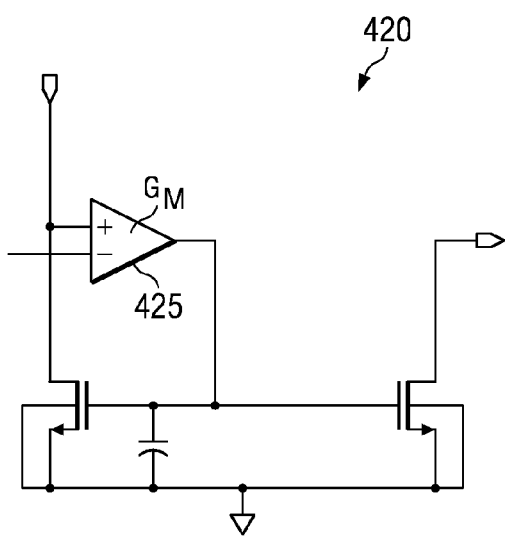
FIG. 4C is a circuit diagram of an alternative implementation of the current mirror of FIG. 4A.
Figure 4B:
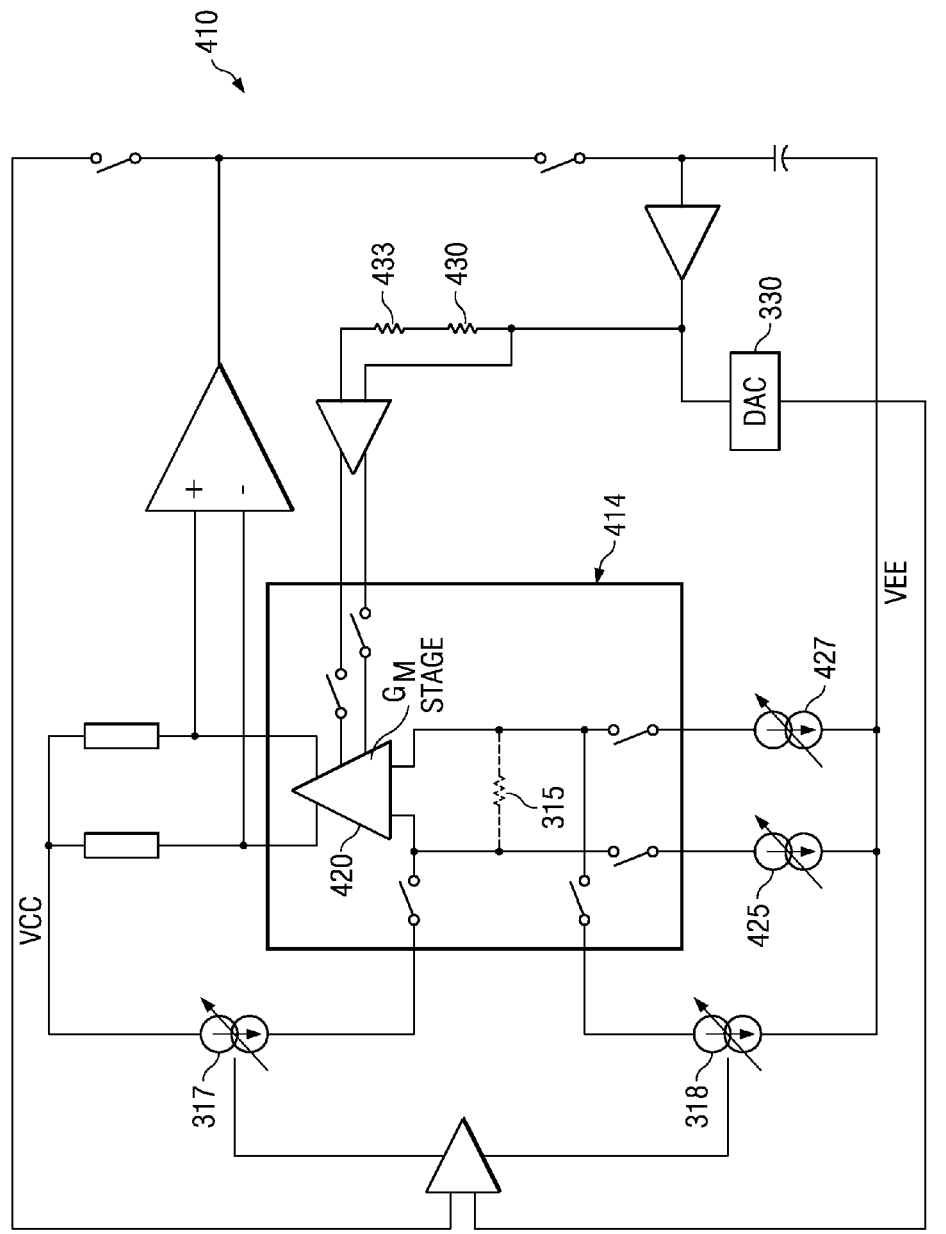
FIG. 4B is a circuit diagram of an input stage architecture for current and voltage bias.

FIG. 4B is a circuit diagram 410 of an input stage architecture for both voltage and current bias. Box 414 contains the GM stage 420 which is repeated per head and 'senses' the signal in the sensor 315. The load above the GM stage 420 converts the current signal from the GM stage 420 to differential voltage which goes both to the GM stage 420 for biasing and to the main signal path. The bias currents for the GM stage 420 is provided by the current sources 425, 427 and is shared by all heads. The current sources 317 and 318 provides current for the biasing of the sensor 315 and are also shared by all heads. In the voltage bias mode the DAC 330 provides the current that is converted to biasing voltage by resistor 430 and resistor 433. In the current bias mode the DAC 330 directly controls the current sources 317 and 318 for the programmed bias current. Turning now to FIG. 4C, this figure is a circuit diagram 420 of an alternative implementation of the current mirror that is contained within the DAC 330 of FIG. 4B. This implementation is a noise-filtering current mirror that includes a filter 425 with an associated transconductance Gm. As a result the noise filtering current is $$f_{-3dB} = \frac{(GmR_{o,M1})g_{m,M1}}{2\pi C_0}.$$

Consequently, using this noise-filtering mirror reduces low frequency noise or flicker noise, thus improving the SNR at low frequencies, typically less than 1 MHz.

Figure 4D:
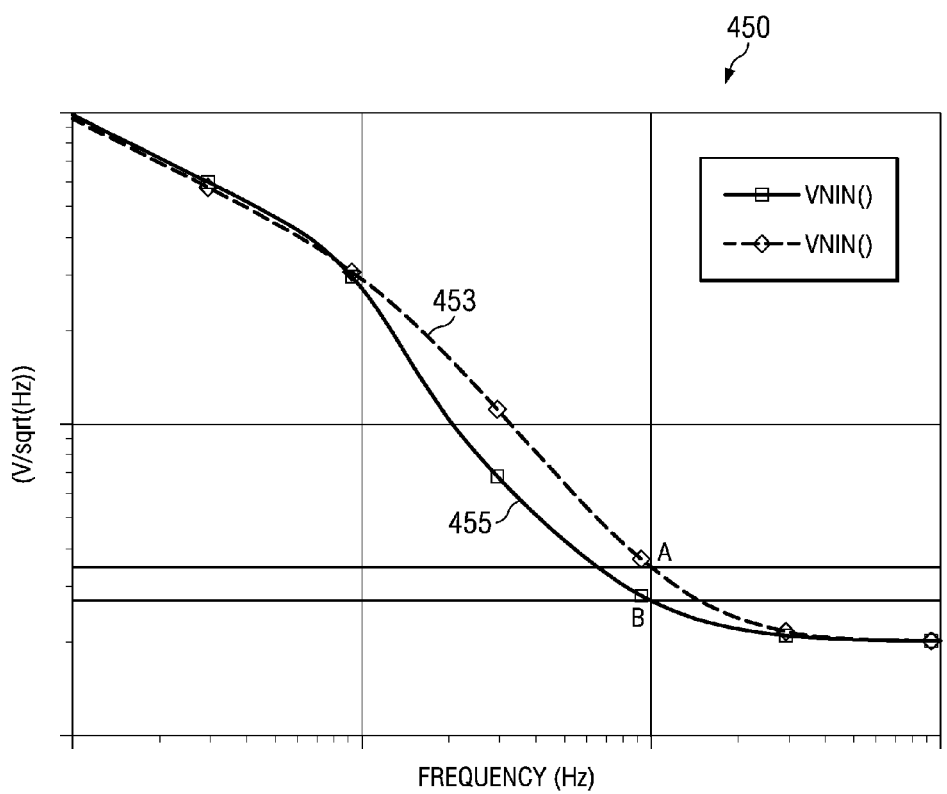
FIG. 4D is a graph illustrating improvement in noise filtering.
Figure 5A:
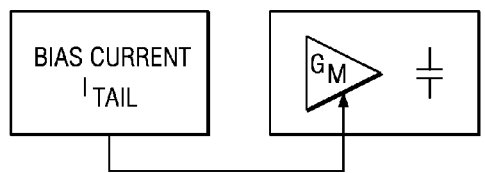
FIG. 5A is a block diagram of a programmable filter.
Figure 5B:
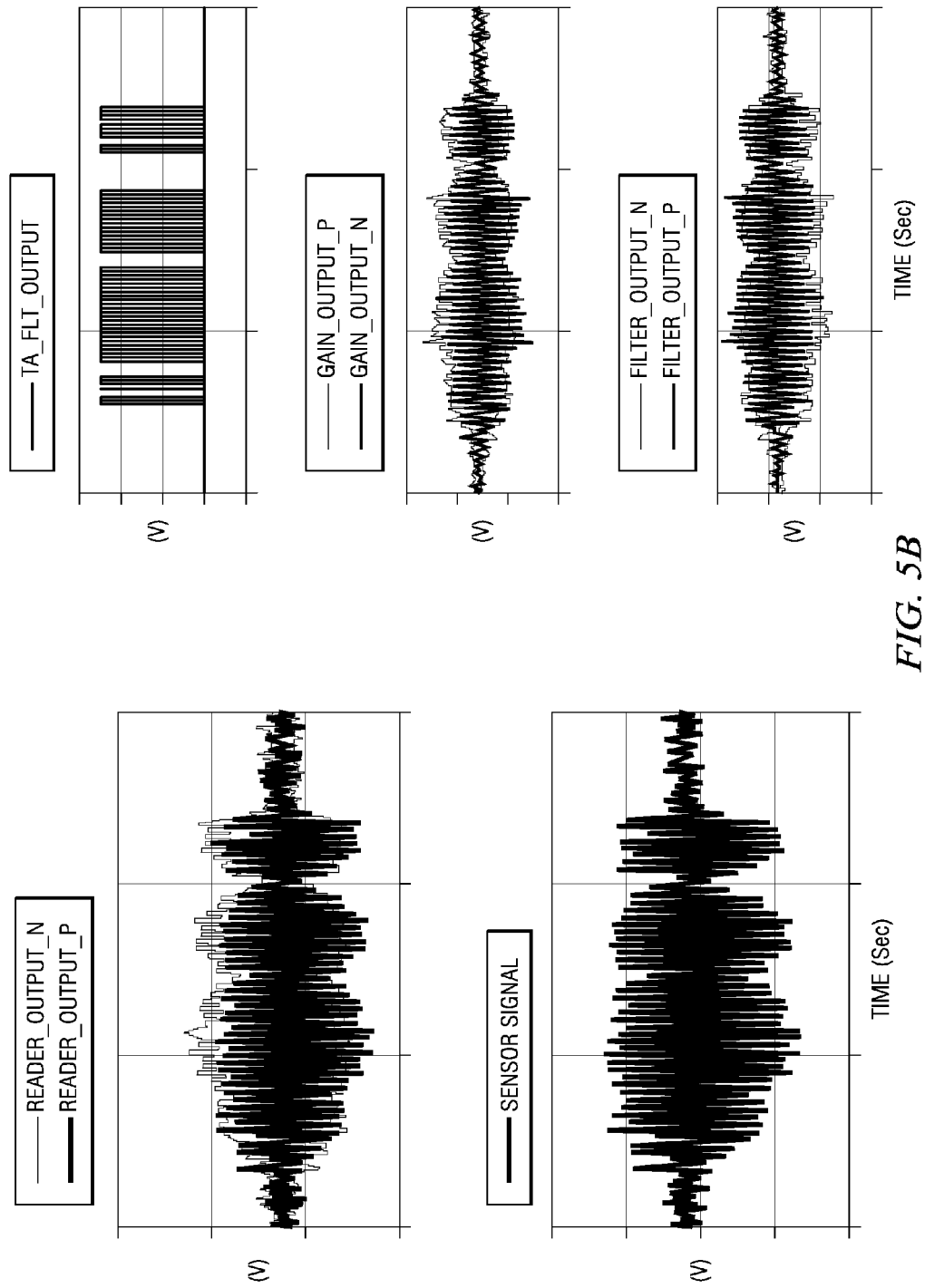
FIGS. 5B-5C are graphs illustrating proximity detection using the head sensor both with and without fault detection.
Figure 5C:
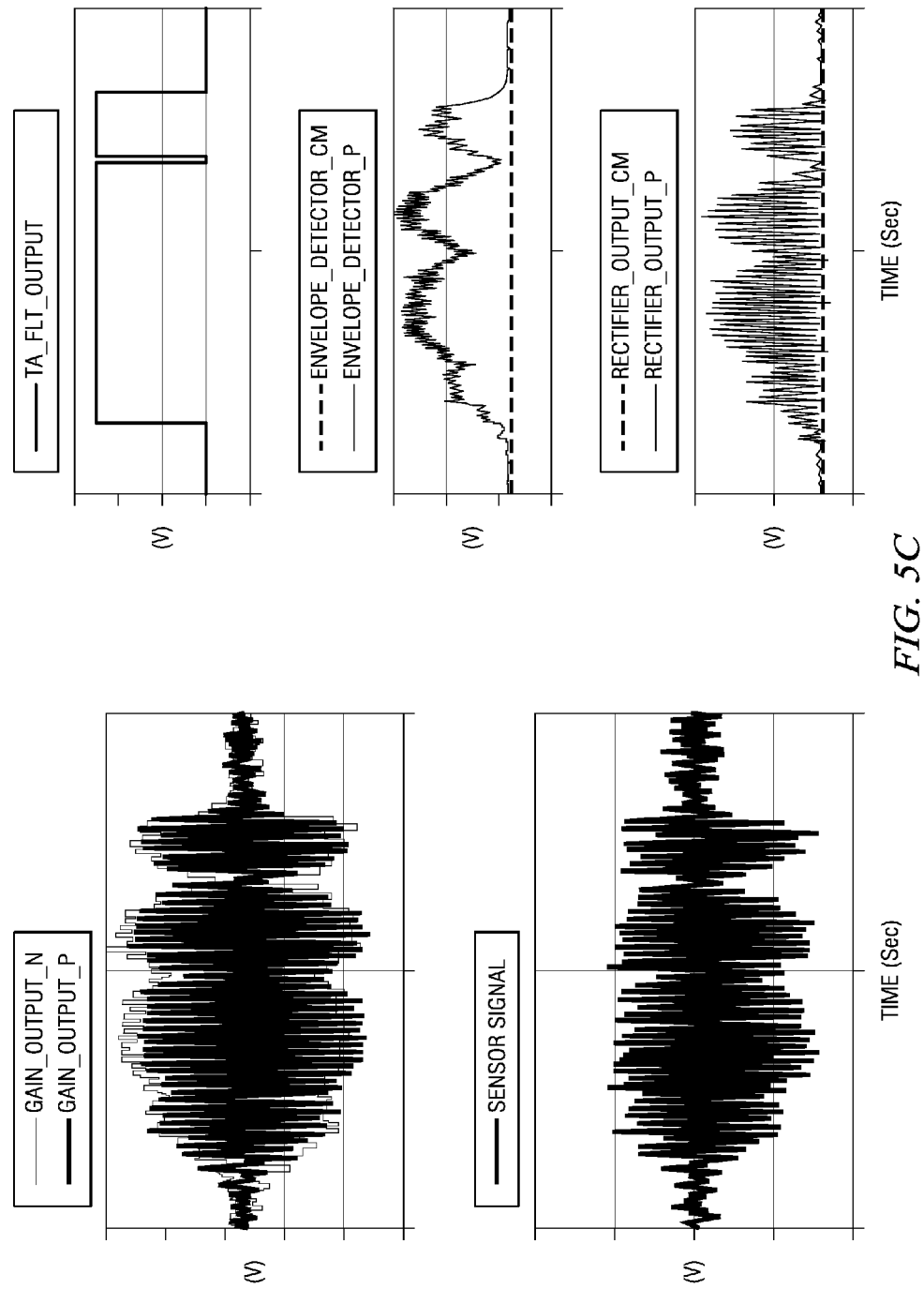

FIG. 4D is a graph illustrating improvement in noise filtering, where input-referred noise is observed to be reduced between approximately 100 kHz and approximately 1 MHz with the proposed noise-filtering current mirror. FIG. 5A is a block diagram of a programmable $G_m$-C filter, such as the filter 425 or the filter 435. The corner frequency of this filter may be a function of the ratio of the transconductance to the capacitance. Programmable filters like this can control corner frequencies, which is needed to optimize the SNR of the sensor signal in every drive. The current that controls the $G_m$ is derived from a trimmed current that is proportional to the capacitance. This implementation makes the ratio constant over PVT, such that the transconductance $G_m$ is proportional to the capacitance C, and hence the variation of the high-pass and low-pass corner frequencies of the filter reduces significantly (around 50% improvement). FIG. 5B illustrates a proximity detection scenario using the head sensor for fault detection. FIG. 5C illustrates a proximity detection scenario using the head sensor envelope detection technique for fault detection.

Figure 6:
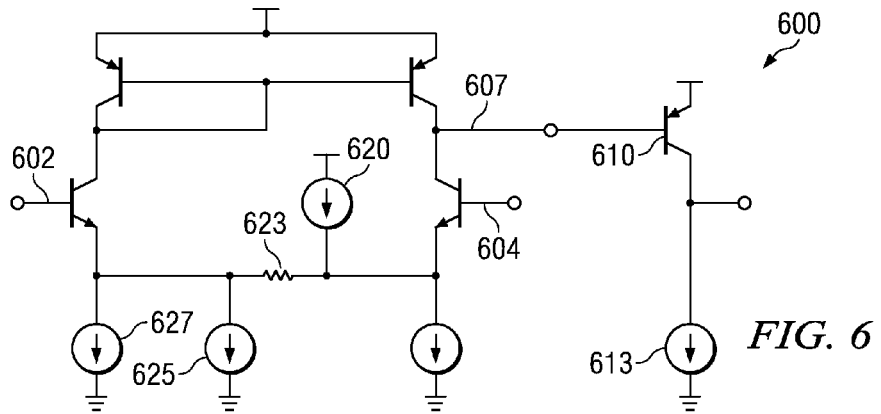
FIG. 6 is a circuit diagram 600 of an implementation of the detector 350, which may be a fault detector.

FIG. 6 is a circuit diagram 600 of an implementation of the detector 350, which may be a fault detector. This detector may receive a multiplexed signal on input terminals 602, 604 and transmit a fault signal using an output terminal 607. These input terminals are differential, which may provide offset cancellation and noise reduction. An output transistor 610 can pull the output terminal 607 to a supply voltage or this transistor in combination with the current source 613 can pull this output terminal to a low voltage. The output terminal 607 goes low when the difference of the input terminals 602, 604 is greater than the product of the current from the current source 620 and the impedance associated with the resistor 623. As a consequence, the threshold voltage for the detector shown in circuit 600 is the product of this current and impedance. When the fault signal on the output terminal 607 is a logic high, hysteresis current begins that cancels out the threshold current, thus lowering the threshold voltage. When the sensor input signal amplitude starts reducing indicating the end of the fault duration, the fault goes logic low at a lower threshold controlled by the hysteresis current. The hysteresis current can be programmable to enable different falling-edge thresholds. Hysteresis is beneficial when the amplified sensor signal is noisy, especially when the amplified sensor signal amplitude is close to the threshold, which might cause multiple faults. Multiple faults for a single proximity detection event may cause the fault counter to saturate (reach its maximum count value) quickly. Providing a lower falling edge threshold using hysteresis avoids having multiple faults when sensor signal amplitude is close to the programmed threshold. This helps to minimize saturating the fault counter over time.

Figure 7A:
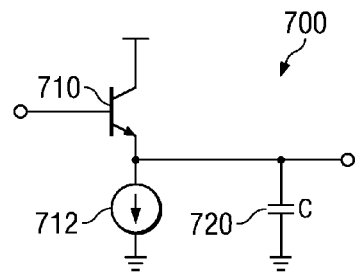
FIG. 7A is a circuit diagram of one implementation of the decay block within an envelope detector.
Figure 7B:
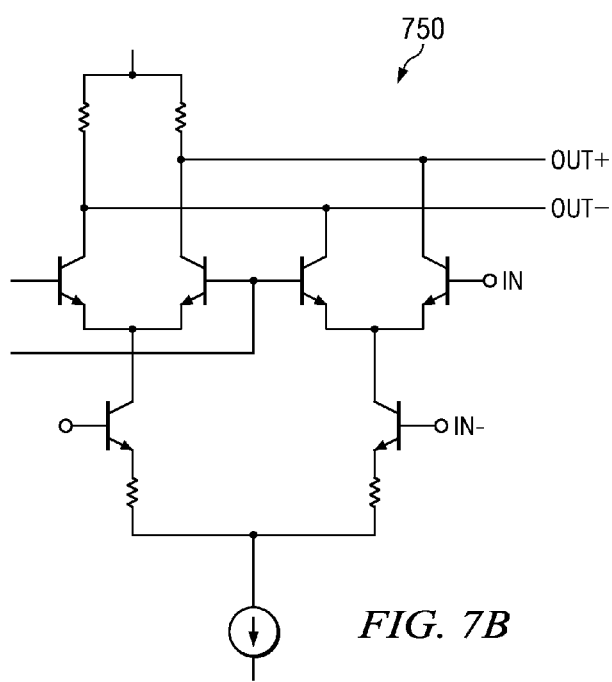
FIG. 7B is a circuit diagram of a rectifier within an envelope detector.

FIG. 7A is circuit diagram 700 of a one implementation of a decay block in an envelope detector like envelope detector 360. This decay block includes a programmable decay route, through transistor 710 and programmable current source 712. In addition, the decay block also includes a programmable capacitor 720. When the input to transistor 710 rises, the transistor turns ON and provides current to charge up the capacitor 720 quickly to the voltage determined by the input voltage amplitude. However, when the input to transistor 710 falls and the transistor turns OFF, the capacitor discharges slowly according to the time-constant created by the capacitor. This operation allows for holding a charge on the capacitor, which results in capturing the low-frequency envelope of the signal. Turning now to FIG. 7B, this figure is a circuit diagram 750 of a rectifier within an envelope detector like envelope detector 360. The output voltage of this rectifier may be proportional to the square of the input voltage of the rectifier. In addition, the circuit diagram 700 and the circuit diagram 750 are just one of many types of decay blocks rectifiers that may be used with the envelope detector 360.

Figure 8A:
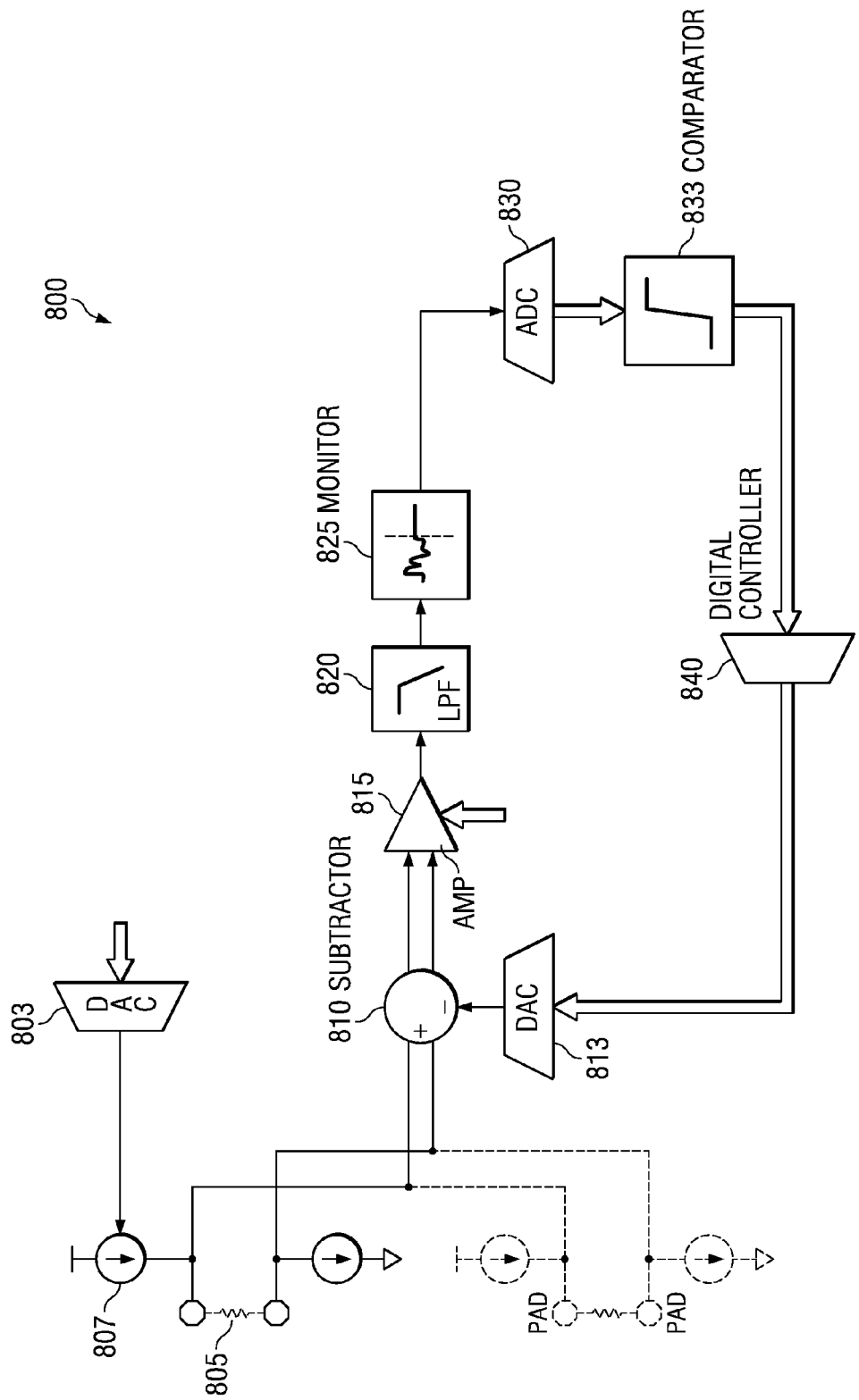
FIG. 8A is a block diagram of a second implementation of the proximity sensing system of FIG. 3.

FIG. 8A is a block 800 diagram of a second implementation of the proximity sensing system 110 for proximity detection. In this implementation, this proximity sensing system detects the position of an associated head, such as the head 126. The block diagram 800 implementation has a bias digital to analog converter (DAC) 803 that biases a sense resistor 805 using an essentially constant current source 807 enabling detection of the voltage across this sense resistor. In one implementation, these modes may be two sequential modes, such as an initialization mode and a sensing mode. The DAC 803, sense resistor 805, and current source 807, may be selected depending on the range of sensor bias voltage/current desired, and also such that the noise created by the DAC is very low in the operating sensor frequency range. Since the resistance associated with the sense resistor 805 may vary only slightly, such as less than approximately 4%, this implementation effectively detects the fly height using two Modes that may be sequential.

The initialization mode may be the first mode. In this mode, a subtractor 810 receives a bias voltage signal from the bias DAC 803 and an offset voltage from an offset DAC 813. The subtractor 810 transmits a difference signal to an amplifier 815, which amplifies this signal. The amount of amplification may be selected through the serial port or can be controlled with an internal closed loop. A filter 820, such as a low pass filter, may remove unwanted high frequencies from this amplified signal and transmit a filtered signal. A monitoring circuit 825, or track and hold circuit, transmits an output signal in response to processing the filtered signal. During transitioning from READ to WRITE modes or vice versa, there might be signal fluctuations or noise, which should be overlooked. Accordingly, when the preamp transitions from READ mode to WRITE mode, at the instant of time when RNW (Read or WRITE) logic signal switches, the last voltage detected in READ mode is held constant at the output, and the detection resumes after a finite duration into the WRITE Mode. This is enabled by the track-and-hold circuitry, which can transmit a resume detection signal. An analog to digital converter (ADC) 830 converts the output signal to a digital signal and then transmits it to a comparator 833. Firmware may control both the ADC 830 and the comparator 833. This comparator transmits a compared signal to a digital controller 840. This controller may send an offset signal for varying a voltage of the output signal until it is approximately equal the bias voltage.

Figure 8B:
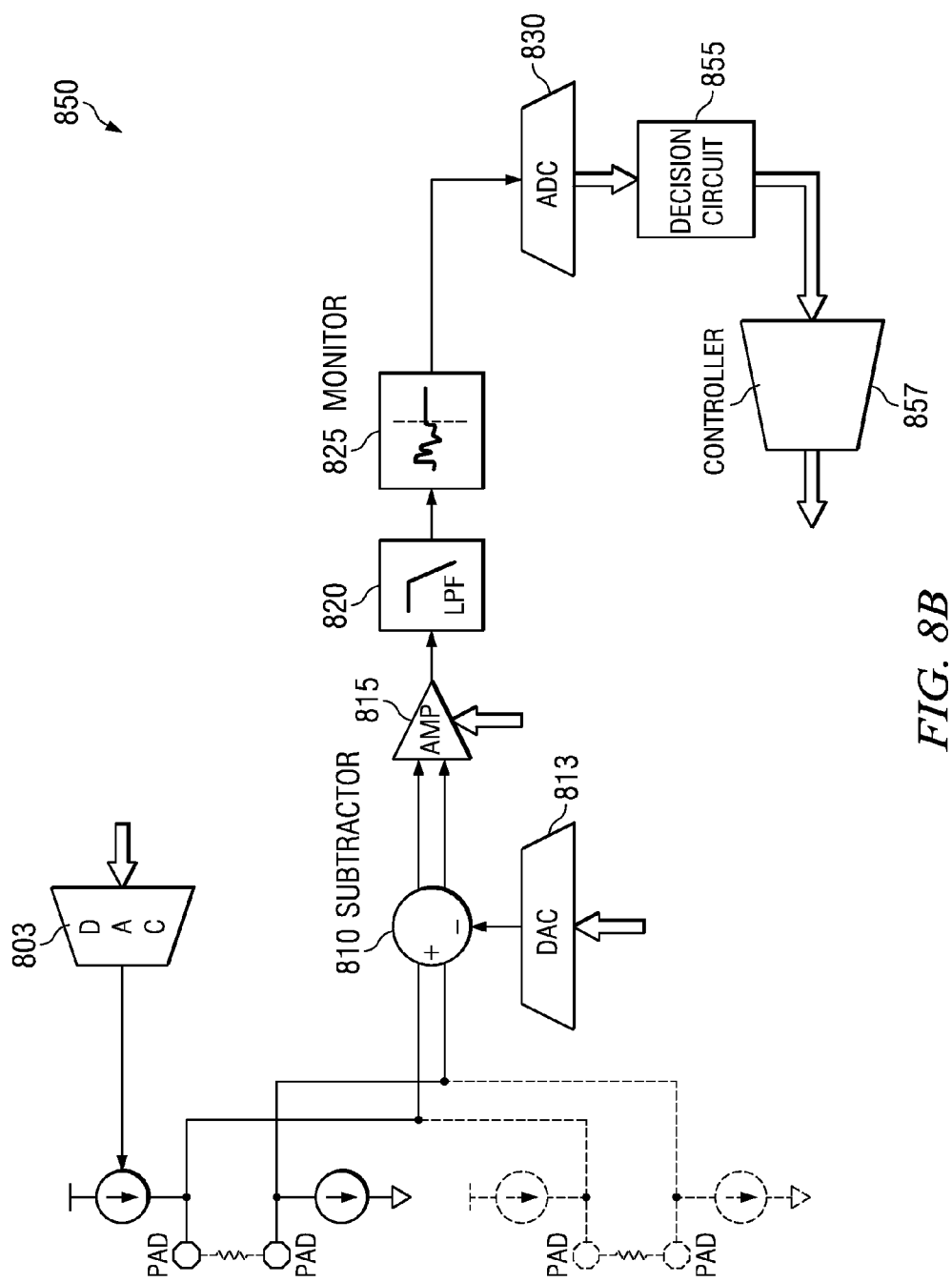
FIG. 8B is a block diagram illustrating an alternative implementation of the block diagram of FIG. 8A.
Figure 8C:
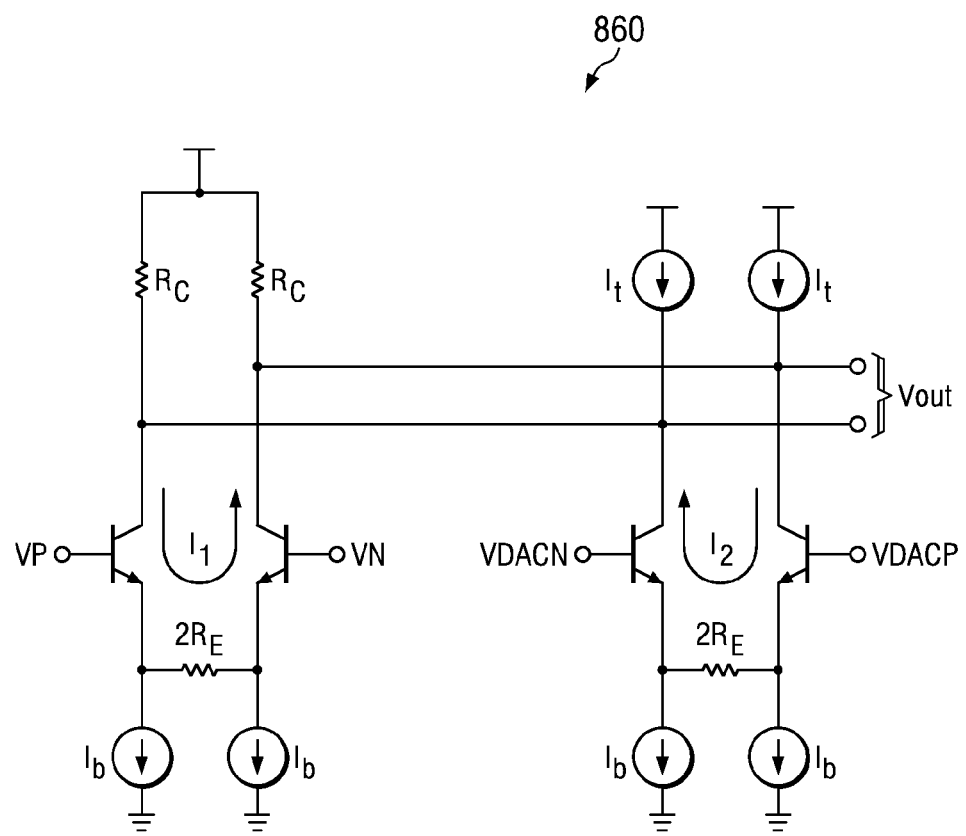
FIG. 8C is a circuit diagram of one implementation of the subtractor.

A sensing mode may follow the initialization mode. In an alternative implementation there may be more than two modes and the types of modes may vary. During the sensing mode, the fly height for the head 126 may be reduced by increasing the power delivered to an associated heater element of the head. This heating causes the head 126 to protrude, which reduces the fly height and alters the resistances associated with the resistor 805, and changes the bias voltage received by the subtractor 810. As mentioned above, the subtractor 810 transmits a difference signal to an amplifier 815, which amplifies this signal. The filter 820 removes unwanted frequencies from this signal and transmits a filtered signal. The monitoring circuit 825 transmits an output signal in response to processing the filtered signal. The ADC 830 converts the output signal to a digital signal and then transmits it to a comparator 833. This comparator transmits a compared signal to a digital controller 840. This controller may determine the height by comparing the voltage of the output signal to the bias voltage. Turning now to FIG. 8B, this is a block diagram 850 illustrating an alternative implementation of the block diagram 800 described with reference to FIG. 8A. In this implementation, a firmware decision circuit 855 (which can also be implemented as an on-chip decision circuit in a closed loop fashion) receives the digitized output signal and transmits a signal to a digital controller 857. The initialization loop varies the offset DAC 813 such that the difference between internal offset voltage/current is very close to the sensor voltage/current. In the free-running Mode, whenever the sensor voltage/current changes due to reduction in fly height that is detected as a lowering of temperature or increasing of sensor resistance, the difference between sensor voltage/current and the internals et offset voltage/current increases. This difference is amplified and sensed to determine the fly height of the magnetic head 126 regardless of the proximity of this head to the media. FIG. 8C is a circuit diagram 860 of one implementation of the subtractor 810. In this implementation, the currents help reduce saturation of the input bipolar devices and increases the dynamic range of the subtractor. The output voltage Vout is proportional as indicated with the following formula:

$$V_{out} \propto \frac{(V_P - V_N)}{V_{DAC}}$$

since the differential output currents from the 2 differential pairs flows through the resistors Rc.

Figure 9A:
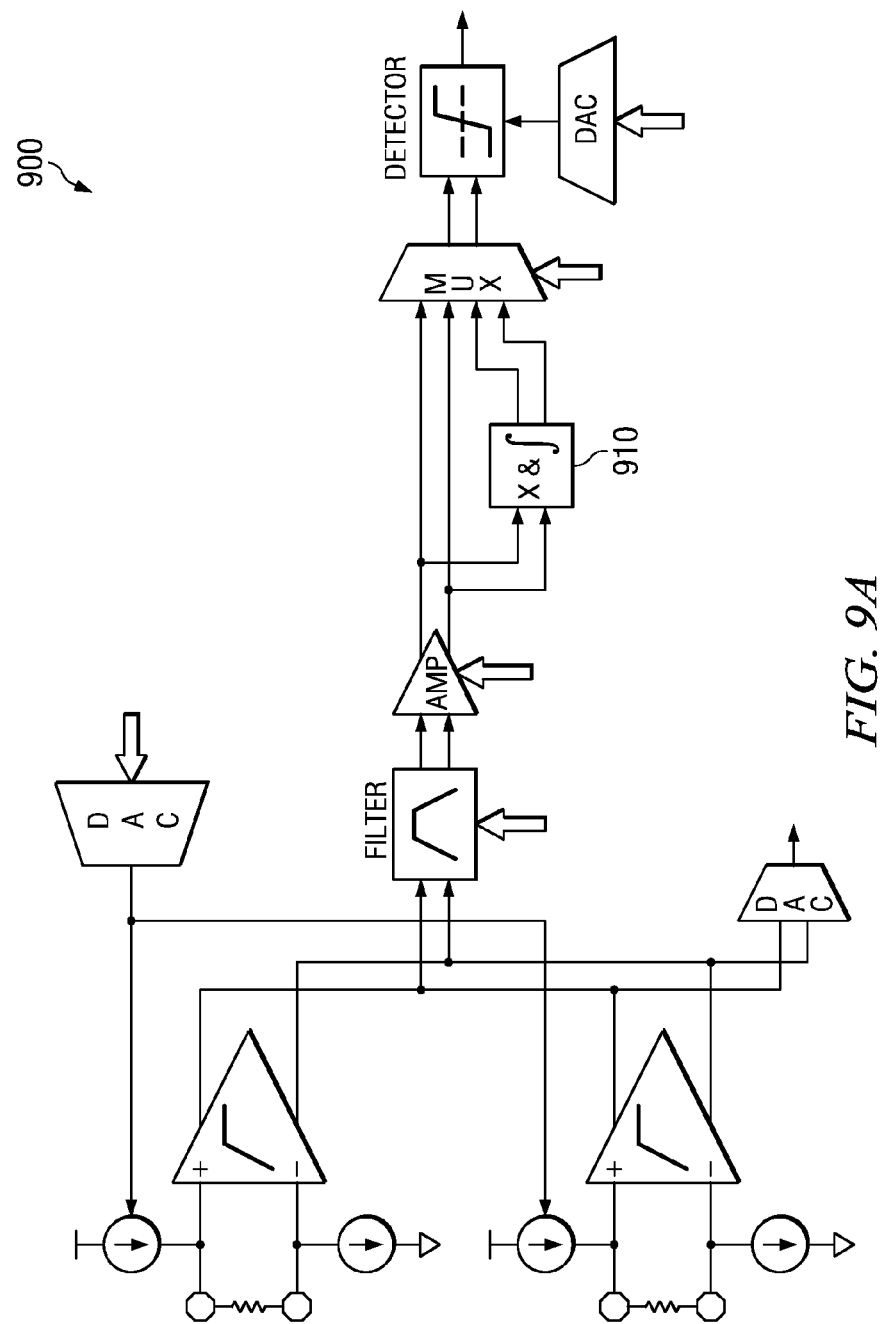
FIG. 9A is a block diagram of a third implementation of the proximity sensing system for proximity detection with enhanced detection reliability.

FIG. 9A is a block 900 diagram of a third implementation of the proximity sensing system 110 for proximity detection with enhanced detection reliability. In summary, this implementation enhances the detection reliability by improving the signal to noise ratio. This implementation relics on the fact that the sensor signal is basically a narrow bandwidth sinusoidal signal added with electronic and other noise and therefore integrating the signal energy for longer duration provides a improved threshold margin. This technique is suitable for finer sensing of the fly height; however it requires a longer time for fly height estimation. The signal path is same up to the gain block. The bandwidth-limited signal is then square and integrated to estimate the signal energy. The dump signal controls the time of the integration and resets the output of the integrator.

Figure 9B:
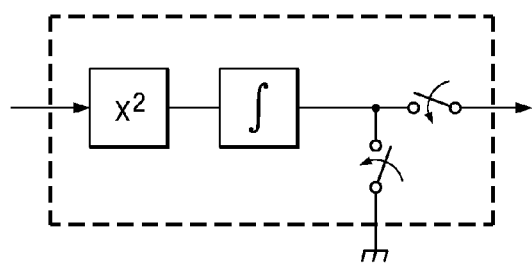
FIG. 9B is one implementation of the energy detection block of FIG. 9A.
Figure 9C:
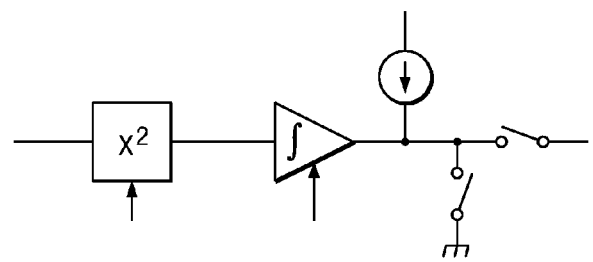
FIG. 9C is an implementation of the energy detection block with offset cancellation
Figure 9D:
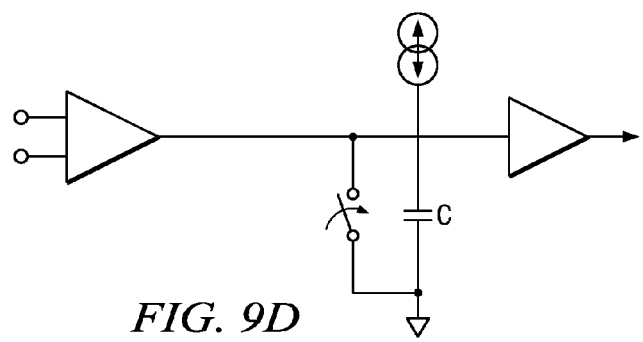
FIG. 9D is a block diagram of the integrator of FIG. 9B.
Figure 9E:
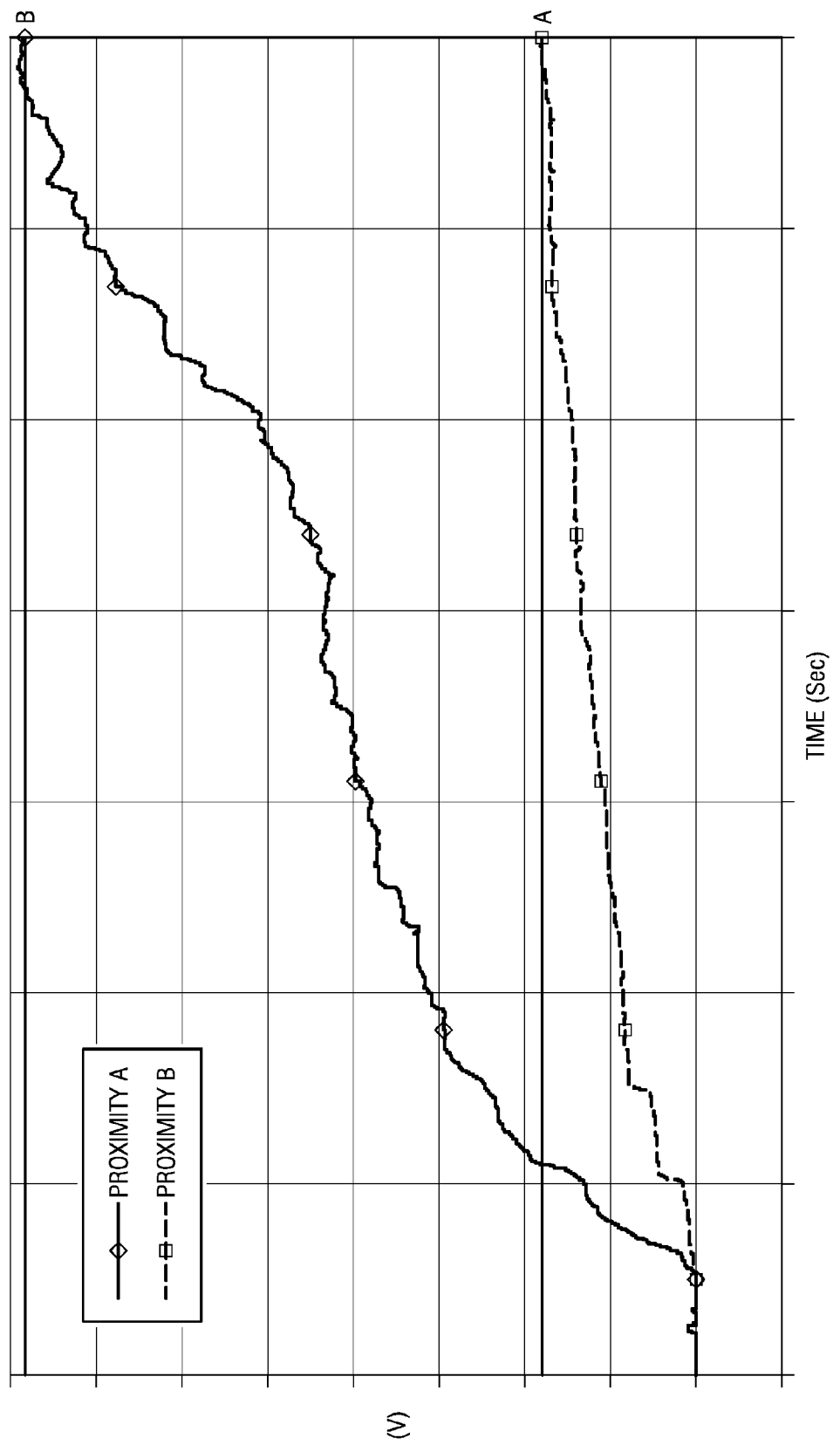
FIG. 9E is a plot illustrating voltage variations with time for two different proximity positions.
Figure 9F:

FIGS. 9B-9C are block diagrams illustrating integrate/dump and offset cancellation. The signal energy integration and dump function can be achieved with different circuit implementation. One of the possible implementation includes a Gilbert multiplier that generates the square of the signal, very low bandwidth integrator that collects the signal energy. The offset of the system can be cancelled using a DAC controlled current that is set during the start up. FIG. 9D is a block diagram for one of the implementations of the integrate and dump of FIGS. 9B-9C. The integrator is implemented using high output impedance Gm and a capacitor. The dump functionality is achieved by a low leakage MOS. FIG. 9E is a plot illustrating how voltage varies in the presence of a sensor signal. The reference signal (signal closer to the X axis) is a result of the noise integrated over a period of 700 us. The integrated sensor signal (signal above reference) shows the extra signal energy integrated over that period.

While various embodiments of the proximity sensing system have been described, it may be apparent to those of ordinary skill in the art that many more embodiments and implementations are possible that are within the scope of this system. Although certain aspects of the proximity sensing system may be described in relation to specific techniques or structures, the teachings and principles of the present system are not limited solely to such examples. All such modifications are intended to be included within the scope of this disclosure and the present proximity sensing system and protected by the following claim(s).

The invention claimed is:

1. A proximity sensing system for detecting when a head is in close proximity to a media, comprising:
    a low noise input stage for transmitting an input sense signal;
    a programmable band pass filter coupled to the low noise input stage and operative for transmitting a first filtered signal in response to receiving the input sense signal;
    a programmable gain stage coupled to the programmable band pass filter and operative for transmitting a first gain signal;
    a multiplexer for transmitting a multiplexed signal in response to receiving a control signal and at least the first gain signal; and
    a detector coupled to the multiplexer for receiving the multiplexed signal, wherein the detector is operative for determining when the multiplexed signal exceeds a threshold signal associated with contacting the media.

2. The proximity sensing system of claim 1, wherein the low noise input stage further comprises:
    a first stage in series having input terminals;
    an input capacitor coupled across the input terminals;
    a second stage coupled to the outputs of the first stage and to the programmable band pass filter and operative for transmitting the input sense signal; and
    a low pass filter coupled to the inputs of the first stage, and the first and second stages.

3. The proximity sensing system of claim 2, further comprising a first pair of switches coupled between the first stage and the second stage and a second pair of switches coupled between the low pass filter and the first stage.

4. The proximity sensing system of claim 1, wherein the input stage further comprises transconductor coupled to a sensor resistor coupled between the input.

5. The proximity sensing system of claim 1, wherein the proximity sensing system may be used with a plurality of heads and the proximity sensing system further comprises a single bias stage for biasing each of the plurality of heads.

6. The proximity sensing system of claim 1, wherein the input stage further comprises a noise filtering current mirror.

7. The proximity sensing system of claim 6, wherein the noise filtering current mirror further comprises a programmable GmC filter.

8. The proximity sensing system of claim 5, wherein the noise filtering current mirror reduces noise by at least approximately 100 kHz.

9. The proximity sensing system of claim 1, further comprising an envelope detector coupled to the programmable gain stage and the multiplexer.

10. A data storage system for detecting a location of a head relative to a media, comprising:
    arms;
    a preamplifier circuit adapted to be coupled to the arms for controlling the arms; and
    a proximity sensing system positioned within the preamplifier circuit, the proximity sensing system comprising:
        an input stage for transmitting an input sense signal;
        a programmable gain stage coupled to receive the input sense signal and operative for transmitting a gain signal in response to receiving the input sense signal;
        a multiplexer coupled to receive the gain signal and at least one control signal, the multiplexer operative for transmitting a multiplexed signal;
        a detector coupled to receive the multiplexed signal and a second control signal, the detector operative for transmitting an output signal;
        wherein an amplitude associated with the output signal enables detecting the location of the head.

* * * * *